United States Patent
Krull et al.

(10) Patent No.: US 12,161,962 B2
(45) Date of Patent: Dec. 10, 2024

(54) GASKET AND FRAME ASSEMBLY FOR AIR FILTER

(71) Applicants: Timothy L. Krull, Kearney, NE (US); Levi William Dexter, Elm Creek, NE (US)

(72) Inventors: Timothy L. Krull, Kearney, NE (US); Levi William Dexter, Elm Creek, NE (US)

(73) Assignee: Baldwin Filters, Inc., Cleveland, OH (US)

( * ) Notice: Subject to any disclaimer, the term of this patent is extended or adjusted under 35 U.S.C. 154(b) by 516 days.

(21) Appl. No.: 17/487,689

(22) Filed: Sep. 28, 2021

(65) Prior Publication Data
US 2022/0126227 A1  Apr. 28, 2022

Related U.S. Application Data (60) Provisional application No. 63/106,452, filed on Oct. 28, 2020.

(51) Int. Cl.
| | | |
|---|---|---|
| *B01D 46/00* | (2022.01) | |
| *B01D 46/10* | (2006.01) | |
| *B01D 46/52* | (2006.01) | |
| *F02M 35/024* | (2006.01) | |

(52) U.S. Cl.
CPC ......... *B01D 46/0005* (2013.01); *B01D 46/10* (2013.01); *B01D 2265/028* (2013.01); *B01D 2271/022* (2013.01); *B01D 2271/027* (2013.01); *B01D 2275/406* (2013.01)

(58) Field of Classification Search
CPC ............ B01D 46/0002; B01D 46/0004; B01D 46/0005; B01D 46/10; B01D 46/521; B01D 2265/026; B01D 2265/028; B01D 2271/022; B01D 2271/027; B01D 2275/406; B01D 2279/60; F02M 35/02416; F02M 35/02425
USPC ..... 55/495, 497, 498, 502, 385.3; 123/198 E
See application file for complete search history.

(56) References Cited

U.S. PATENT DOCUMENTS

| | | |
|---|---|---|
| 5,415,677 A | 5/1995 | Ager et al. |
| 6,312,489 B1 | 11/2001 | Ernst et al. |
| 8,034,145 B2 | 10/2011 | Boehrs et al. |
| 8,277,532 B2 | 10/2012 | Reichter et al. |
| 8,292,983 B2 | 10/2012 | Reichter et al. |
| 8,357,219 B2 | 1/2013 | Boehrs et al. |
| 8,409,312 B2 | 4/2013 | Görg et al. |

(Continued)

FOREIGN PATENT DOCUMENTS

| | | |
|---|---|---|
| DE | 202007014822 U1 | 2/2009 |
| DE | 102016011158 A1 | 3/2018 |

OTHER PUBLICATIONS

Donaldson; Engine Air Cleaners, Service Parts and Accessories; 5 pages; known to the applicant on or before Jan. 15, 2021.

*Primary Examiner* — Minh Chau T Pham
(74) *Attorney, Agent, or Firm* — Reinhart Boerner Van Deuren P.C.

(57) ABSTRACT

An air filter element and air filter system are provided. The filter element has an annular gasket that has multiple portions. A first portion provides axial sealing while a second portion provides only radially sealing. The filter element includes a frame with a radial abutment for engagement with a tooth on a filter housing for providing lateral biasing to the portion of the gasket that provides radial sealing.

21 Claims, 10 Drawing Sheets

(56) References Cited

U.S. PATENT DOCUMENTS

| | | | | |
|---|---|---|---|---|
| 8,480,779 | B2 | 7/2013 | Boehrs et al. | |
| 8,496,723 | B2 | 7/2013 | Reichter et al. | |
| 8,636,820 | B2 | 1/2014 | Reichter et al. | |
| 8,709,119 | B2 | 4/2014 | Reichter et al. | |
| 8,741,017 | B2 | 6/2014 | Nelson | |
| 8,784,522 | B2 * | 7/2014 | Menssen | B01D 50/20 55/497 |
| 8,840,699 | B2 | 9/2014 | Bruce et al. | |
| 8,906,128 | B2 | 12/2014 | Reichter et al. | |
| 8,915,985 | B2 | 12/2014 | Dewit et al. | |
| 8,920,528 | B2 | 12/2014 | Dewit et al. | |
| 9,120,047 | B2 | 9/2015 | Boehrs et al. | |
| 9,180,399 | B2 | 11/2015 | Reichter et al. | |
| 9,399,972 | B2 | 7/2016 | Boehrs et al. | |
| 9,527,023 | B2 | 12/2016 | Reichter et al. | |
| 9,795,911 | B2 | 10/2017 | Reichter et al. | |
| 9,937,455 | B2 | 4/2018 | Boehrs et al. | |
| 9,956,516 | B2 | 5/2018 | Nelson | |
| 10,065,145 | B2 | 9/2018 | Reichter et al. | |
| 10,137,396 | B2 | 11/2018 | Raether et al. | |
| 10,279,300 | B2 | 5/2019 | Nelson | |
| 10,315,144 | B2 | 6/2019 | Reichter et al. | |
| 10,343,101 | B2 | 7/2019 | Coulonvaux et al. | |
| 10,357,732 | B2 | 7/2019 | Rieger et al. | |
| 10,421,034 | B2 | 9/2019 | Reichter et al. | |
| 10,427,083 | B2 | 10/2019 | Boehrs et al. | |
| 10,512,868 | B2 | 12/2019 | Adamek et al. | |
| 10,556,201 | B2 | 2/2020 | Reichter et al. | |
| 10,603,618 | B2 | 3/2020 | Boehrs et al. | |
| 10,618,816 | B2 | 4/2020 | Campbell et al. | |
| 10,632,410 | B2 | 4/2020 | Dewit et al. | |
| 10,688,427 | B2 * | 6/2020 | Dirnberger | B01D 46/10 |
| 10,864,475 | B2 | 12/2020 | Reichter et al. | |
| 10,954,899 | B2 | 3/2021 | Kaufmann et al. | |
| 11,117,082 | B2 * | 9/2021 | Neef | B01D 46/0041 |
| 11,198,083 | B2 * | 12/2021 | Adamek | B01D 46/526 |
| 11,583,796 | B2 * | 2/2023 | Krull | B01D 46/88 |
| 11,633,686 | B2 * | 4/2023 | Neef | B01D 46/24 55/502 |
| 2006/0091064 | A1 | 5/2006 | Brown et al. | |
| 2010/0229511 | A1 | 9/2010 | Steins et al. | |
| 2011/0308214 | A1 * | 12/2011 | Jessberger | B01D 46/2411 55/502 |
| 2014/0318090 | A1 * | 10/2014 | Rieger | B01D 46/10 55/495 |
| 2015/0007732 | A1 | 1/2015 | Hasenfratz et al. | |
| 2018/0369736 | A1 | 12/2018 | Reichter et al. | |
| 2020/0114292 | A1 | 4/2020 | Reichter et al. | |
| 2020/0114296 | A1 | 4/2020 | Boehrs et al. | |
| 2020/0171419 | A1 | 6/2020 | Adamek et al. | |
| 2020/0179862 | A1 | 6/2020 | Reichter et al. | |
| 2020/0206671 | A1 | 7/2020 | Boehrs et al. | |
| 2020/0246741 | A1 | 8/2020 | Dewit et al. | |

\* cited by examiner

GASKET AND FRAME ASSEMBLY FOR AIR FILTER

CROSS-REFERENCE TO RELATED PATENT APPLICATIONS

This patent application claims the benefit of U.S. Provisional Patent Application No. 63/106,452, filed Oct. 28, 2020, the entire teachings and disclosure of which are incorporated herein by reference thereto.

FIELD OF THE INVENTION

The present invention relates to an air filter system for use in filtering air. The disclosure particularly relates to the sealing of a filter element within a filter housing.

BACKGROUND OF THE INVENTION

Air streams can carry contaminant material therein. It is often desirable to filter these contaminants from the air stream before the air enters a particular system or operation, such as in the case of combustion air entering an engine in a motor vehicle or other power generation equipment.

In filtering systems where a replaceable filter element is inserted into a filter housing, sealing of the filter element within the filter housing is extremely important. In order to effectively filter out contaminants from the air stream as it passes through the filter element and the housing, the seal between the filter element and the housing should be airtight. If not, unfiltered air and dislodged contaminants can pass through gaps between the filter element and the filter housing and enter the system.

These types of filtering systems are known to create axial sealing forces when a gasket of the filter element is axially compressed under a clamping force created between a filter housing lid and a filter housing body in a closed position. It is desirable to improve upon the known unidirectional sealing forces to improve the overall sealing between the filter element and the filter housing, and thus improve the overall filtering effectiveness of the unit.

BRIEF SUMMARY OF THE INVENTION

At least one embodiment of the invention provides an air filter system, comprising a filter housing having a housing body with an inlet and an outlet in fluid communication. The filter housing has an annular seal surface extending radially outward from the housing body at the inlet of the housing body. The annular seal surface has an outer lip at an outer edge of the annular seal surface. The housing body also has a housing tooth extending from an inner edge of the annular seal surface axially outward in a direction substantially perpendicular to the annular seal surface.

The air filter system further comprises a filter element having a frame having an inlet panel and a slot. The inlet panel has an annular surface surrounding an inlet opening. The annular surface has exterior and interior edges. The slot is located through one side of the annular surface between the interior and exterior edges of the inlet panel. The filter element also has a gasket attached to the annular surface of the inlet panel. The gasket is formed such that the slot in the annular surface is uncovered, as well as the portion of the annular surface between the slot and the exterior edge of the annular surface. The gasket has a raised portion between the slot and the interior edge of the annular surface. The filter element is situated within the housing body such that the gasket seals against the annular seal surface of the housing body, and such that the housing tooth is disposed through the slot in the annular surface, wherein the interaction between the frame and the housing tooth provides a lateral bias of the housing tooth against the raised portion of the gasket.

In a further embodiment, a filter element is provided. The filter element is for use in a filter housing that has a first housing seal interface that surrounds a storage cavity. The filter element seals with the first housing seal interface to prevent dirty fluid or impurity bypass between the filter housing and the filter element. The filter element includes filter media, a frame and a gasket. The frame is attached to the filter media. The gasket is secured to the frame. The gasket includes a filter element seal interface that surrounds the filter media and is configured to mate with the first housing seal interface, the gasket including a first portion providing an axial seal surface forming part of the filter element seal interface and a second portion providing a radial seal surface forming part of the filter element seal interface.

In one embodiment, the frame is more rigid than the gasket.

In one embodiment, the gasket is an annular gasket. The first portion of the gasket has a greater radial dimension than the second portion of the gasket.

In one embodiment, the gasket has a radially outer periphery formed, at least in part, by the first and second portions. The second portion is stepped radially inward from the first portion forming a radial step in the radially outer periphery of the gasket.

In one embodiment, the axial seal surface of the first portion defines a first plane with the first portion being positioned axially on a first side of the first plane. At least a portion of the radial seal surface of the second portion is axially offset from the first plane and is positioned on a second side of the first plane, opposite the first side.

In one embodiment, a first portion of the frame that is adjacent the second portion of the gasket extends radially outward beyond the second portion of the gasket.

In one embodiment, the first portion of the frame includes a slot extending axially therethrough.

In one embodiment, the slot has a radially inner edge and a radially outer edge. The radial seal surface of the gasket is positioned radially at or radially outward of the radially inner edge of the slot.

In one embodiment, the filter element includes at least one end cap. The filter media includes a first face; a second face and a first end. The filter media extends axially between the first and second faces. The first end extends between the first and second faces. The first end cap secures to the first end. The first end cap is positioned radially between the second portion of the gasket and the first end of the filter media.

In one embodiment, the gasket includes a third portion between the first portion and the second portion. This third portion may connect the first portion to the second portion. The first portion is angularly offset from the second portion. The first portion only provides an axially directed seal and the second portion only provides a radially directed seal. As such, at some angular positions of the gasket, only a radially directed seal is provided and at other angular positions only an axially directed seal is provided.

In some examples, the third portion provides both an axially directed seal and a radially directed seal. The third portion allows from transitioning to relying on the axial seal to relying on the radial seal.

In one embodiment, the radial seal surface includes at least one groove formed therein. The groove extends longitudinally in an axial direction generally orthogonal to the axial seal surface.

In another embodiment, an air filter system including an air filter housing and a filter element as outlined above is provided. The filter housing includes a housing body and a housing tooth. The housing body includes a filter element storage cavity fluidly interposed between an inlet and an outlet. The housing body includes a seal surface defining a first housing sealing interface surrounding the filter element storage cavity. The first housing sealing interface includes a first portion including a radially outward extending axial seal surface for providing an axial seal. The filter housing seal interface includes a second portion including an axially extending radial seal surface facing radially into the filter element storage cavity for providing a radial seal. The housing tooth is adjacent the axially extending radial seal surface. The housing tooth is positioned on a first side of the axial seal surface and the radial seal surface, at least in part, is positioned on a second side of the axial seal surface, opposite the housing tooth. The filter element is removably installed within the housing. The first portion of the gasket of the filter element axially seals with the first portion of the first housing sealing interface. The second portion of the gasket radially seals with the second portion of the first housing sealing interface.

In one embodiment, the frame includes a radially extending flange including a radially directed abutment. The radially directed abutment is in radial abutment with the housing tooth radially biasing the frame towards the radial seal surface of the housing body when the filter element is received in the filter element storage cavity. The radial biasing of the frame by the housing tooth radially biasing the second portion of the filter element seal interface into the second portion of the housing seal interface.

In one embodiment, the frame includes a slot formed in the radially extending flange. The radially directed abutment defines a portion of the slot. The slot extends entirely through the radially extending flange along an axis that is generally parallel to a flow axis of fluid flowing through the filter element.

In one embodiment, the radially directed abutment radially faces the filter media of the filter element.

In one embodiment, the gasket is an annular gasket, the first portion of the gasket having a greater radial dimension than the second portion of the gasket.

In one embodiment, the gasket has a radially outer periphery formed, at least in part, by the first and second portions. The second portion is stepped radially inward from the first portion forming a radial step in the radially outer periphery of the gasket. The slot is angularly offset from the first portion of the gasket and is angularly aligned with the second portion of the gasket.

In one embodiment, the axial seal surface of the first portion of the first housing sealing interface defines a first plane. When installed, the first portion of the gasket is on a first side of the first plane. A portion of the radial seal surface of the second portion of the first housing sealing interface is axially offset from the first plane and is positioned on a second side of the first plane, opposite the first side.

In one embodiment, the slot has a radially inner edge and a radially outer edge. The radial seal surface of the gasket is positioned radially at or radially outward of the radially inner edge of the slot.

In one embodiment, the first portion of the gasket is angularly offset from the second portion. The first portion of the gasket only provides an axially directed seal with the first portion of the housing seal interface and the second portion of the gasket only provides a radially directed seal with the second portion of the housing seal interface. As such, at some angular positions, only a radially directed seal is provided by the gasket and at other angular positions only an axially directed seal is provided by the gasket.

Other aspects, objectives and advantages of the invention will become more apparent from the following detailed description when taken in conjunction with the accompanying drawings.

BRIEF DESCRIPTION OF THE DRAWINGS

Embodiments of this invention will now be described in further detail with reference to the accompanying drawings, in which.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
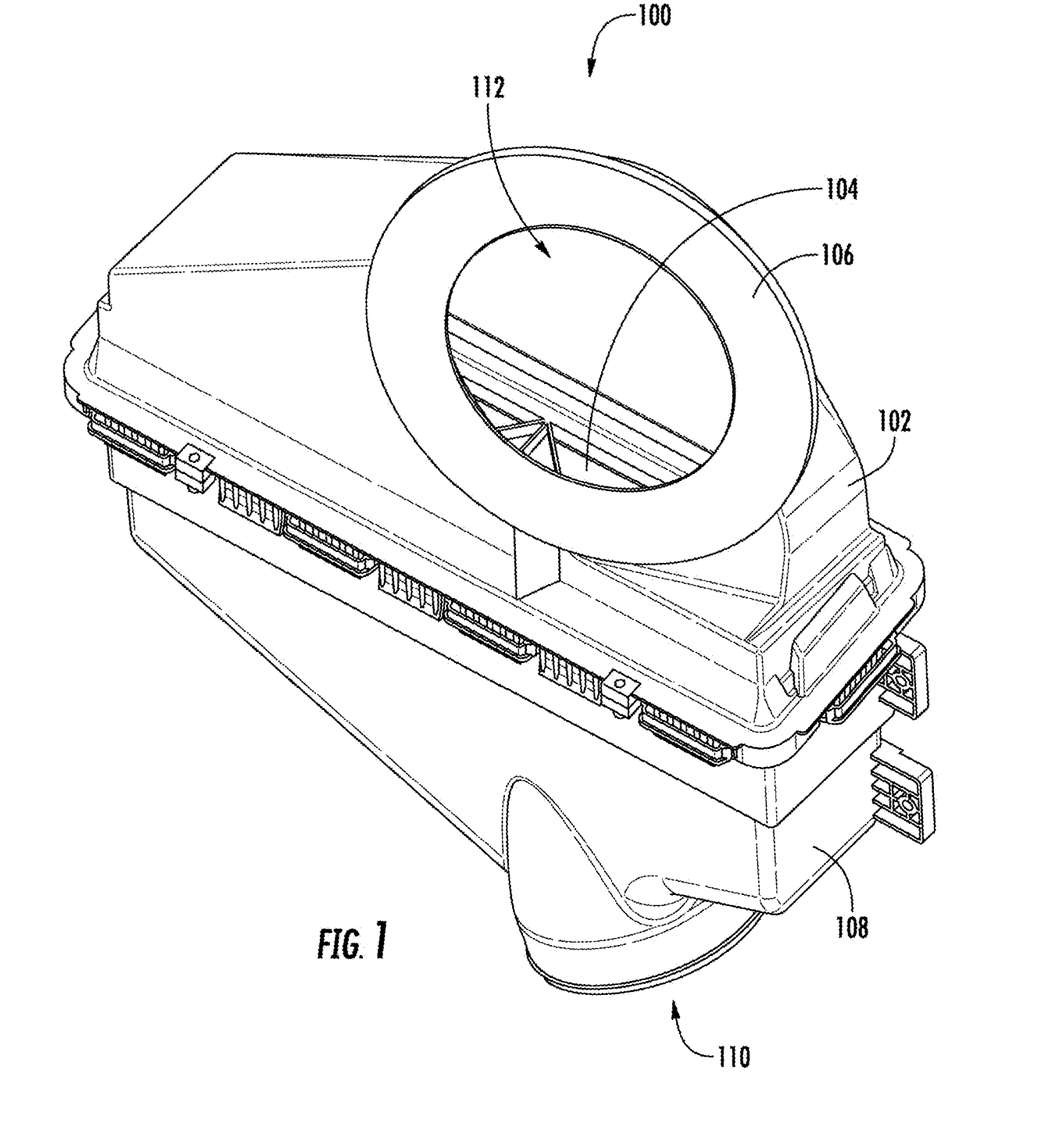
FIG. 1 is a perspective view of an air filter system having a filter element disposed within an air filter housing.
Figure 2:
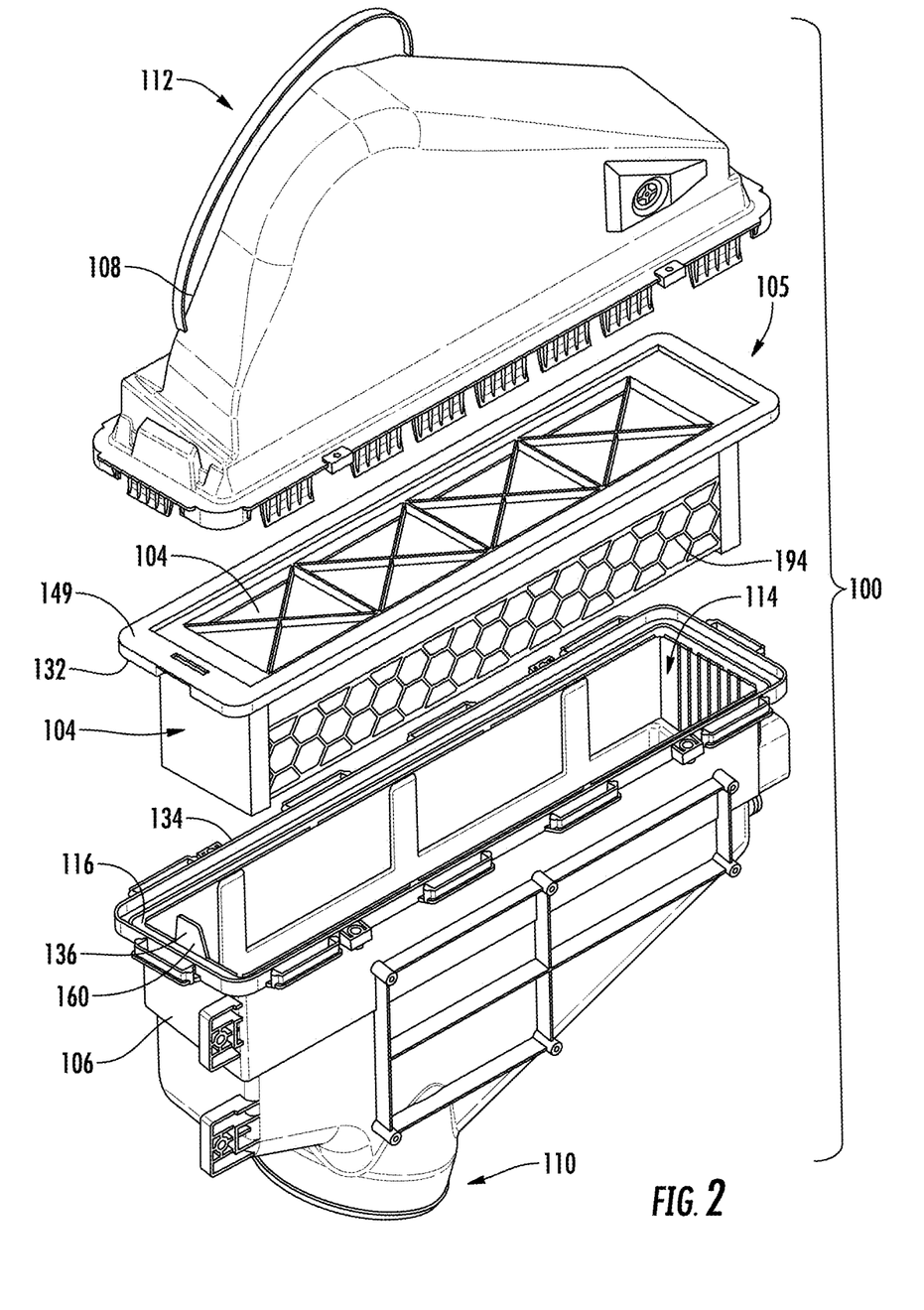
FIG. 2 is an exploded view of the air filter system of FIG. 1.

FIG. 1 illustrates an air filter system 100 in an assembled configuration while FIG. 2 illustrates the air filter system 100 in an exploded configuration. The proposed air filter system 100 includes an air filter housing 102 and a filter element 104. The filter element 104 is removable from the air filter housing 102 such that the filter element 104 can be removed and replaced as necessary.

The air filter housing 102 has a housing body 106 and a separate housing lid 108. The housing body 106 and housing lid define ports 110, 112, which can be either inlets or outlets for dirty and clean air depending on the arrangement of the system. In this example, the port 112 of the housing lid 108 is the inlet into the system 100 and the port 110 of the housing body 106 is the outlet of the system 100.

Figure 3:
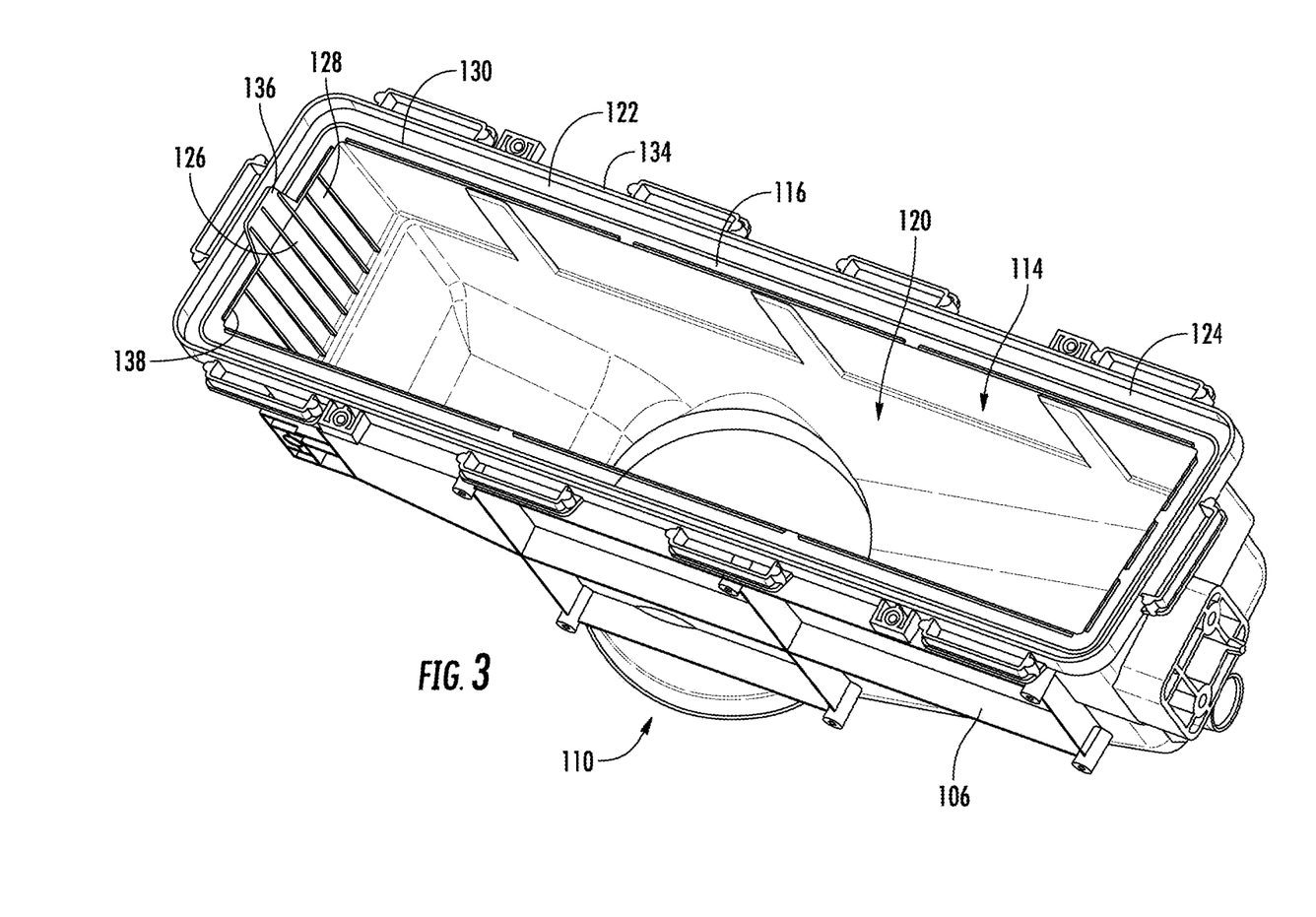
FIG. 3 is a perspective view of the filter body of the filter housing of FIG. 1.

With reference to FIGS. 2 and 3, the housing body 106 has an inlet opening 114 that is in fluid communication with port 110. At the inlet 114, the housing body 106 has a seal surface 116 that defines a first housing sealing interface that surrounds a filter element storage cavity 120. The first housing sealing interface includes a first portion 122 that includes a radially extending axial seal surface 124 as well as a second portion 126 that includes an axially extending radial seal surface 128 that faces radially into the filter element storage cavity 120. The combination of the first and second portions combine such that the filter housing sealing interface extends entirely around the filter element storage cavity 120.

In this example, the housing sealing interface and corresponding seal surfaces 124 and 128 extend around the entire periphery of the housing body such that the housing seal surface is generally annular. Notably, in this example, it is substantially rectangular and thus, annular will include non-round shapes.

The housing sealing interface and particularly the axial seal surface 124 may include, such as in the illustrated embodiment, a sealing bead 130 that extends outward from axial seal surface 124. The sealing bead can facilitate sealing of a gasket 132, which is operably sealing attached to filter element 104, against the filter housing sealing interface.

In one example, axial seal surface 124 is generally planar except for sealing bead 130.

The housing body 106 also has an outer lip 134 formed at the outer edge of the annular seal surface 116. The outer lip 134 extends upward, substantially perpendicular to the annular seal surface 116.

The housing body 106 also has a housing tooth 136. The housing tooth 136 extends upward from the interior edge 138 of the annular seal surface 116, substantially perpendicular to the annular seal surface 116. In this example, the housing tooth 136 is positioned adjacent the second portion 126 that includes the axially extending radial seal surface 128.

Thus, the housing tooth 136 is on a first side of the sealing surface 128.

In some examples, the housing tooth 136 may extend above the outer lip 134 of the housing body 106 at the inlet 114. The housing tooth 136 may have an oval, oblong, rectangular, trapezoidal, or any other shape desired. In some examples, the housing body 106 may have multiple housing teeth. In one example, such as illustrated in FIG. 3, the housing body 106 is generally rectangular in cross-sectional shape and the housing tooth 136 is located along one of the short sides of the housing body 106.

Figure 4:
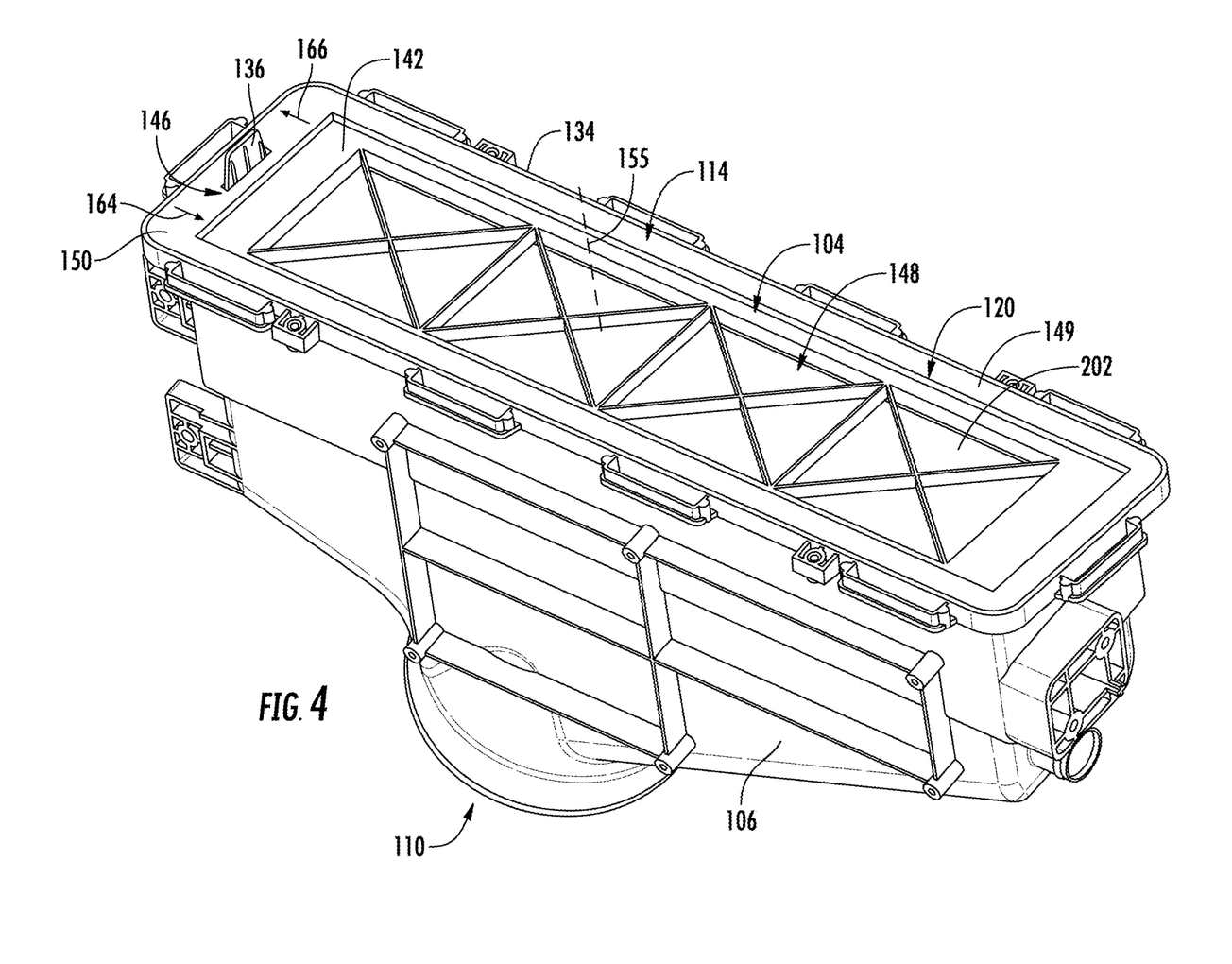
FIG. 4 is a perspective view of the filter system of FIG. 1 with the housing lid removed to show the filter element installed in the housing body.
Figure 5:
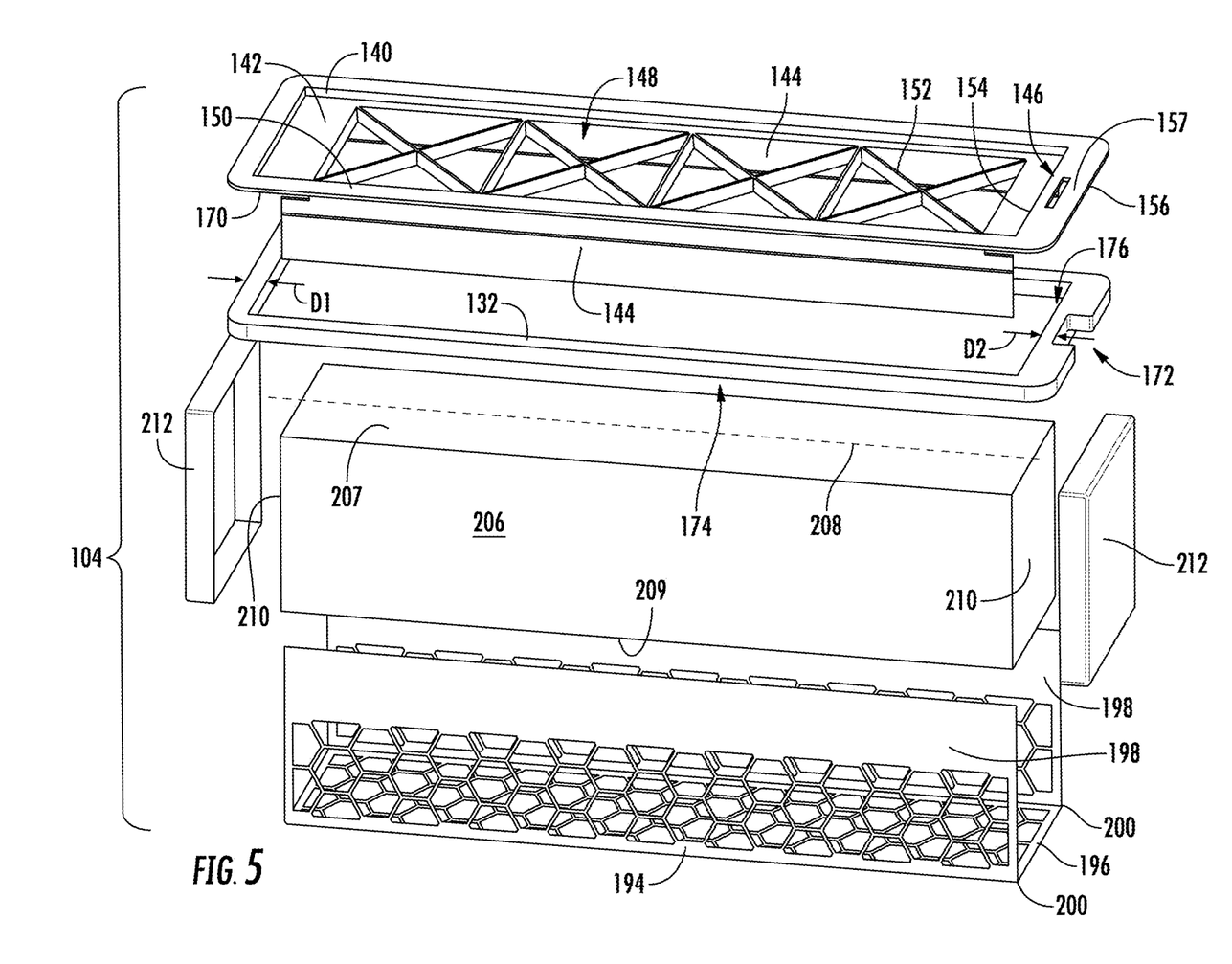
FIG. 5 is an exploded illustration of the filter element of the system of FIG. 1.

The filter element 104 is disposed within the housing body 106 and particularly within the filter element storage cavity 120 as illustrated in FIG. 4. With reference to FIG. 5, the filter element 104 has a frame 140 having an inlet panel 142, two side flaps 144, and a slot 146. The inlet panel 142 is the initial point of entrance for unfiltered air entering the filter element 104. The inlet panel 142 has an inlet opening 148 surrounded by an annular radially direct flange 149 that provides a surface 150. Air can pass through the inlet opening 148. The inlet panel 142 may have webbing 152 or support structures integrated within the inlet opening 148 to maintain the structural rigidity of the inlet panel 142.

In one example, the frame 140 is more rigid than the gasket 132. The frame could be formed from a rigid plastic while the gasket can be formed from a urethane or rubber material. The gasket can be molded to the frame or adhesively secured to the frame. In another example, the frame 140 and gasket 132 need not have different rigidities. However, the difference in rigidities allows the frame to transfer biasing forces to the gasket 132 while allowing the gasket 132 to be compliant and form seals with appropriate sealing surfaces of the housing body 106.

The two side flaps 144 are attached in laterally spaced relation to the inlet panel 142 along opposite interior edges of the inlet panel 142. The two side flaps 144 extend substantially perpendicular to the inlet panel 142. The frame 140 is thus generally U-shaped. The inlet opening 148 is generally located between the pair of side flaps 144.

The slot 146 is located through the radially directed flange 149 that provides annular surface 150 of the inlet panel 142 between the interior edge 154 and the exterior edge 156 of the radially directed flange 149 and annular surface 150. When the filter element 104 is assembled into the housing body 106, the housing tooth 136 is located through the slot 146 as illustrated in FIG. 4. Because the slot 146 cooperates with the housing tooth 136 of the housing body 106, it is desirable for the slot 146 to have a shape that compliments the shape of the housing tooth 136 and is capable of securely receiving the housing tooth 136. When located through the slot 146, the housing tooth 136 is surrounded by the inlet panel 142 at the inlet plane.

When installed in the housing body 106, a portion 157 of the inlet panel 142 (see e.g. FIGS. 5 and 6) is located radially between the outer lip 134 of the housing body 106 and the outer surface 160 (see FIG. 2) of the housing tooth 136. This portion 157 is located proximate slot 146. The portion 157 engages outer surface 160 of housing tooth 136. The engagement with housing tooth 136 creates a lateral bias on the frame 140 and, consequently, filter element 104 in the direction illustrated by arrow 166 (see e.g. FIG. 6) and thus towards the towards outer lip 134 as illustrated by arrow 166. Consequently, this creates lateral bias on the housing tooth 136 that biases the tooth 136 inward and away from the outer lip 134, as illustrated by arrow 164.

As briefly mentioned, the filter element 104 further includes a gasket 132. The gasket is attached to the annular surface 170 of the inlet panel 142. The gasket entirely lines a perimeter edge of the annular surface 170, except for the area over the slot 146 and the area of the annular surface 170 between the slot 146 and the outer edge of the annular surface.

As illustrated in FIG. 5, a notch 172 is formed in the outer periphery of the gasket 132 to prevent the gasket 132 from sufficiently interfering with the housing tooth 136 during installation that prevents insertion of the housing tooth 136 through slot 146. The notch 172 aligns with the slot 146 and receives the tooth 136 when the filter element 104 is installed. Due to the notch 172, the radially outer periphery of gasket 132 has a radial step therein that accommodates the housing tooth 136 once installed.

In some examples, however, the gasket 132 may extend between the slot 146 and the outer edge 156 of the annular surface 170, but not cover or completely cover the slot 146.

Figure 6:
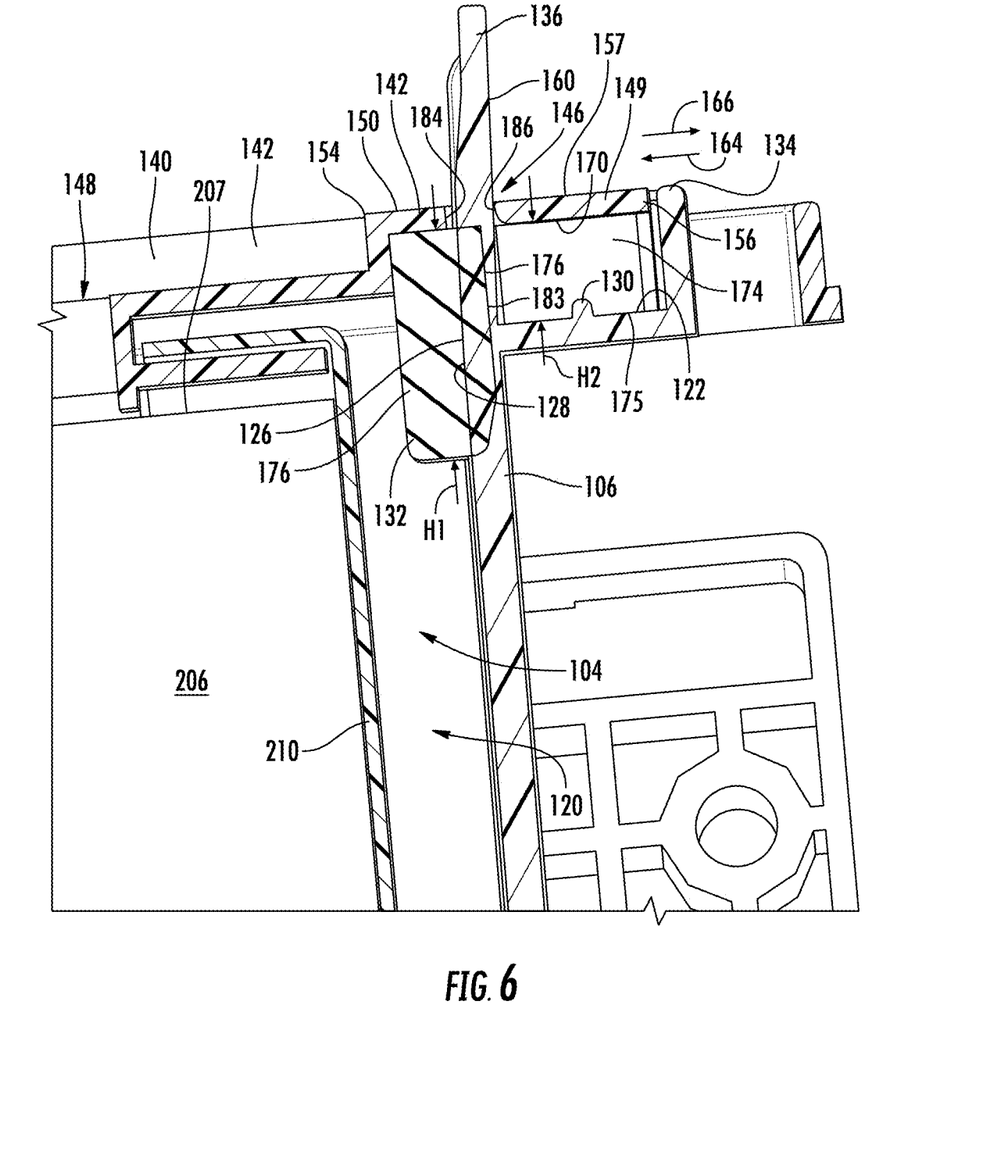
FIG. 6 is an enlarged cross-sectional illustration showing the interaction between the gasket of the filter element and an annular seal surface of the housing body as well as the interaction between a frame of the filter element and a housing tooth of the filter housing.
Figure 7:
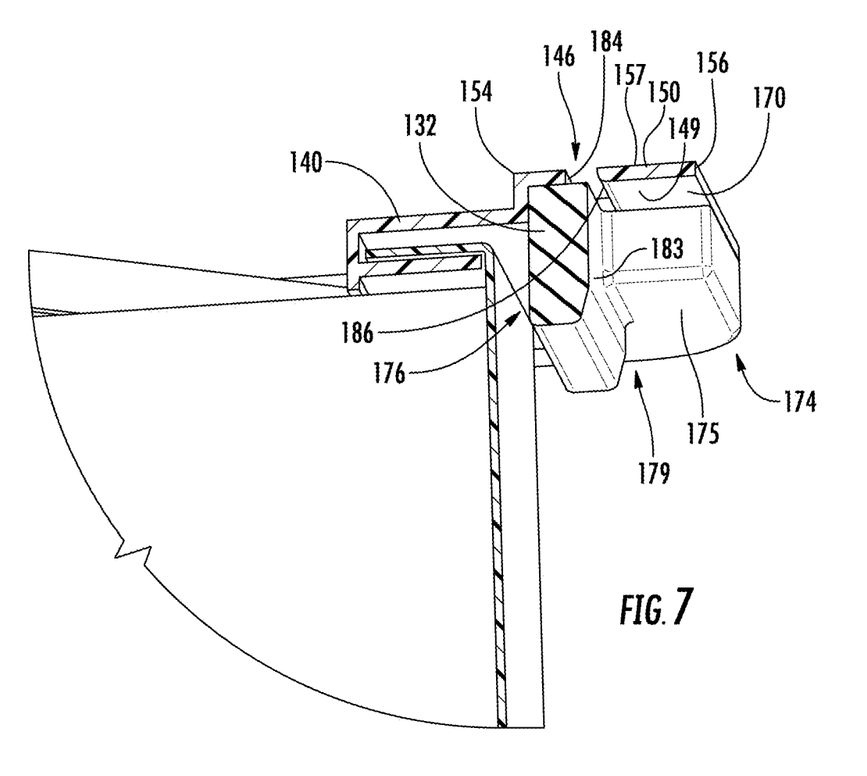
FIG. 7 is a cross-sectional illustration of a portion of the filter element that cooperates with a region of the housing body that includes the housing tooth.
Figure 8:
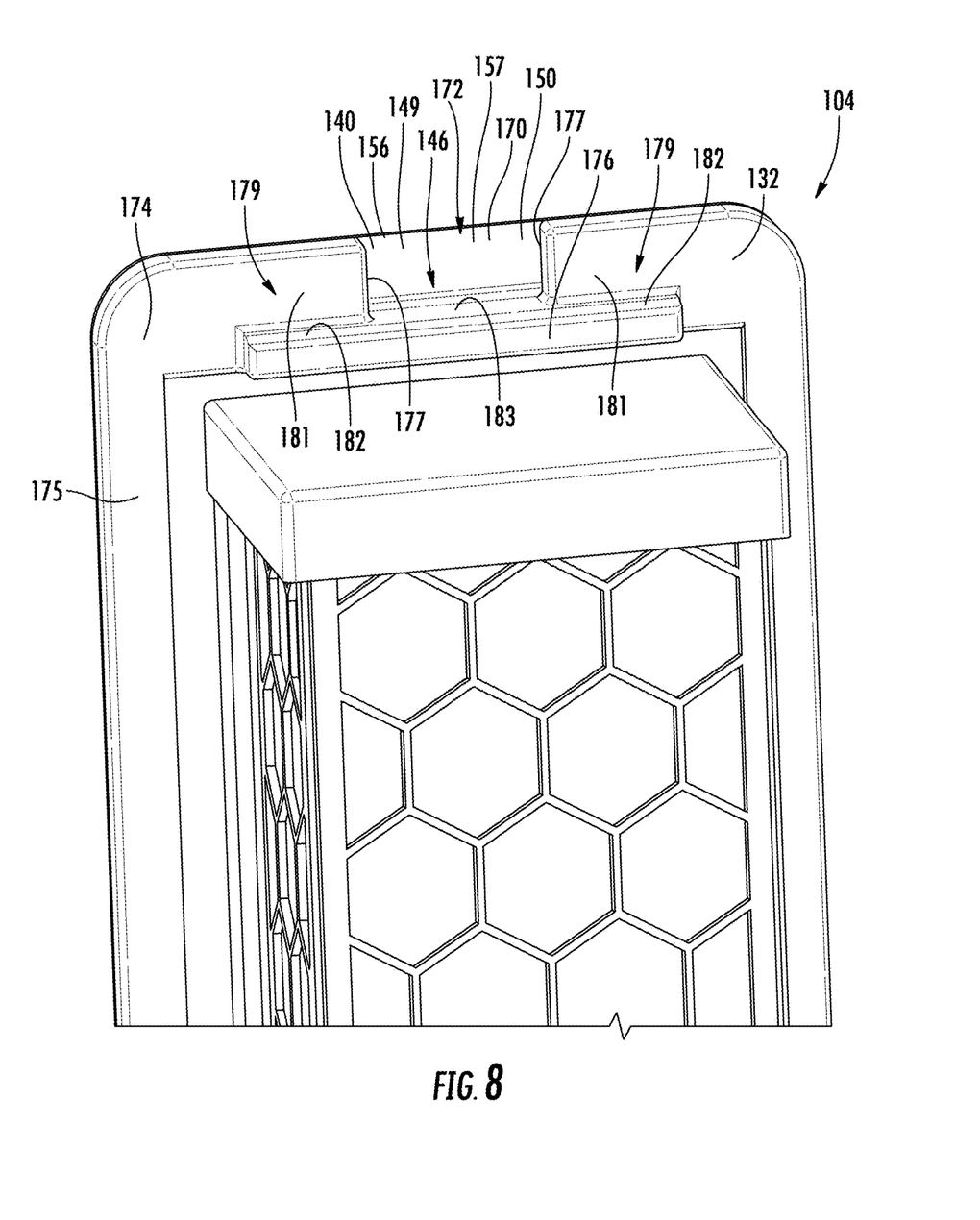
FIG. 8 is a bottom perspective illustration of a portion of the filter element.

With reference to FIGS. 6-8, in this example, the gasket 132 includes a first portion 174 that provides an axial seal surface 175 for sealing with axial seal surface 124. The gasket 132 includes a second portion 176 that is adjacent slot 146 that provides a radial seal surface 183 for sealing with radial seal surface 128 (they are shown overlapped in FIG. 6 for illustrative purposes). In this embodiment, the second portion 176 is only located along one end of the rectangular shape of the gasket 132. The first portion 174 of the gasket extends along at least a portion of all four side of the rectangular shape.

Further, the second portion 176 is located proximate the notch 172. The notch is located between ends 177 (see FIG.

8). Additionally slot 146 is positioned between ends 177. As such, when viewed from the top, the slot 146 is generally angularly aligned with the second portion 176 and is angularly between the ends 177 of the first portion 174 of the gasket 132. The axis about which these components are angularly aligned or offset would be an axis aligned with the flow of air through the filter element 104 (see axis 155 in FIG. 4).

The gasket 132 includes third portions 179 that transition between the first and second portions 174, 176. In this example, the third portions 179 provide both an axial seal surface 180 and a radial seal surface 181. As such, the third portions 179 seal with both the axial and radial seal surfaces 124, 128 of the housing body 106.

As such, when installed, only the first portion 174 provides an axially directed seal, the second portion 176 only provides a radially directed seal and the third portions provide both axial and radially directed seals.

The seal surfaces 175, 180, 181 and 183 of the first, second and third portions provide a filter element seal interface that fully seals with the housing seal interface provided by seal surfaces 124, 128 of the housing body 106.

In this example, the first portion 174 of the gasket 132 is positioned on one side of seal surface 175 while at least a portion of second portion 176 of the gasket is on the opposite side of seal surface 175. As illustrated in FIG. 6, the first portion 174 is above seal surface 175 while a portion of the second portion 176 is below seal surface 175.

In one example, seal surface 124 of the housing seal interface is generally planar. However, in other embodiments, seal surface 124 and any cooperating seal surface of the gasket 132 can be non-planar.

In the illustrated example, when installed, the first portion 174 is located on one side of the plane defined by seal surface 124 and at least a portion of the second portion 176 is on the opposite side of the plane defined by the seal surface 124. The first portion 174 of the gasket has a greater radial dimension D1 than the radial dimension D2 of the second portion 176 as illustrated in FIG. 5. Again, this provides a radial step in the outer peripheral shape of gasket 132. Further, the second portion 176 has a height H1 that is greater than the height H2 of the first portion 174. Thus, there is an axial step between the bottom end of the second portion 176 and the seal surface 175, which forms the bottom of the first portion 174.

The second and third portions 176, 179 extend outward and away from seal surface 175 of the first portion 174.

With reference to FIGS. 6-7, the radially inner edge 184 of slot 146 may be radially inward of seal surface 183 of the second portion when in a relaxed state. As such, in some implementations, when tooth 136 is inserted through slot 146, this further promotes compression of second portion 176 and sealing between the second portion 176 and the seal surface 128. However, the radially outer edge 186 is laterally outward of seal surface 183. Thus, seal surface 183 is located radially between edges 184, 186 that bound, at least in part, slot 146. In some embodiments, the inner edge 184 aligns with seal surface 183. Thus, the seal surface 183 is typically positioned radially at or radially outward of the inner edge 184.

In this example, edge 184 radially faces away from the filter media 206 while edge 186 faces filter media 206. Further, flange 149 is axially offset from the inlet flow face 207 of the filter media 206.

Figure 9:
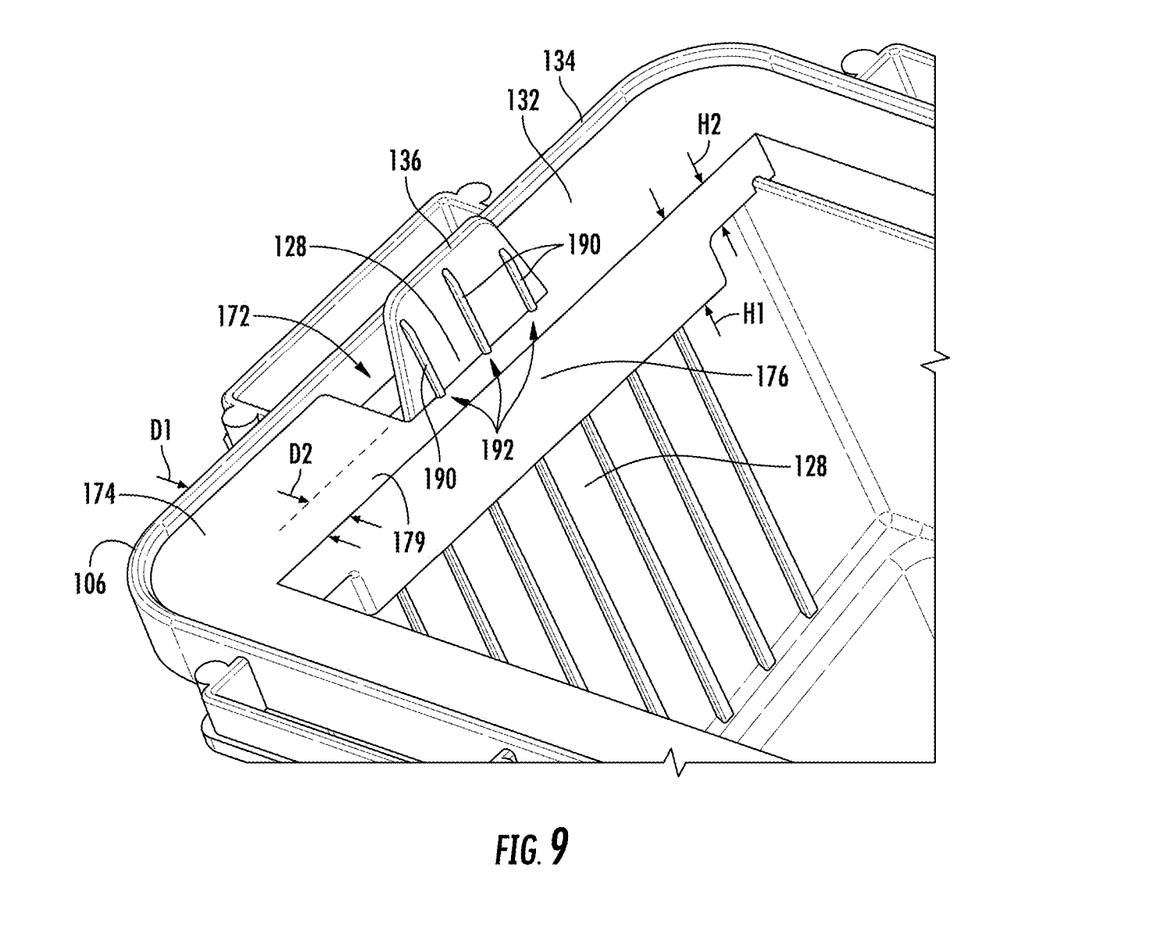
FIG. 9 is a top perspective illustration of the gasket of the filter element located within the housing body.

With reference to FIG. 9, in some examples, seal surface 128 of the housing body 106 includes radially inward extending ribs 190. The second portion 174 of gasket 132 may be sufficiently compliant to form around the ribs 190 when inserted or radially inward direct grooves 192 may be provided to help accommodate ribs 190. Here grooves 192 extend longitudinally in an axial direction that is generally orthogonal to the axial seal surface 175 of the first portion 174.

As noted above, the tooth 136 biases the filter element 104 and particularly frame 140 and gasket 132 radially and against seal surface 128. This force can also help gasket 132 mate with or otherwise seal with seal surface 128.

When the filter system 100 is assembled with the filter element 104 in the filter housing 102, the gasket 132 seals with seal surfaces 124 and 128. This may include sealing with sealing bead 130 as well as with annular lip 134.

Notably, at the location of the housing tooth 136, it has been discussed that the portion of the frame 140 between the annular lip 134 and the housing tooth 136 creates a lateral bias in the housing tooth 136. This lateral bias of the housing tooth 136 compresses the second portion 176 of gasket 132 against the inner surface 128 of the housing tooth 136. As a result, a lateral (also referred to as radial) sealing force is created between the filter housing body 106 and the filter element 104 and particularly gasket 132. The lateral bias is generated by the engagement of outer edge 186 bounding slot 146 and outer surface 160 of tooth 136. Outer edge 186 bounding slot 146 is thus an abutment against which tooth 136 applies pressure biasing the second portion 176 of the gasket 132 into sealing engagement with the second portion 126 of the housing seal interface of housing body 106.

When the housing lid 108 is assembled with the housing body 106, an axial sealing force is created between the filter housing 102 and the filter element 104 due to the compression of the gasket 132 between the housing lid 108 and the housing body 106 (i.e. the housing lid 108 acts on the frame 140 of the air filter element 104 creating a biasing force to compress the gasket 140 in a direction generally parallel to the clamping direction of the housing lid 108). As used herein, generally parallel or generally perpendicular shall include deviations of up to 30 degrees.

The filter element 104 further includes an outlet grate 194 as illustrated in FIGS. 2 and 5. The outlet grate 194, in one embodiment, has a base plate 196 and two side plates 198. The two side plates 198 attach along opposite edges 200 of the base plate 196.

Figure 10:
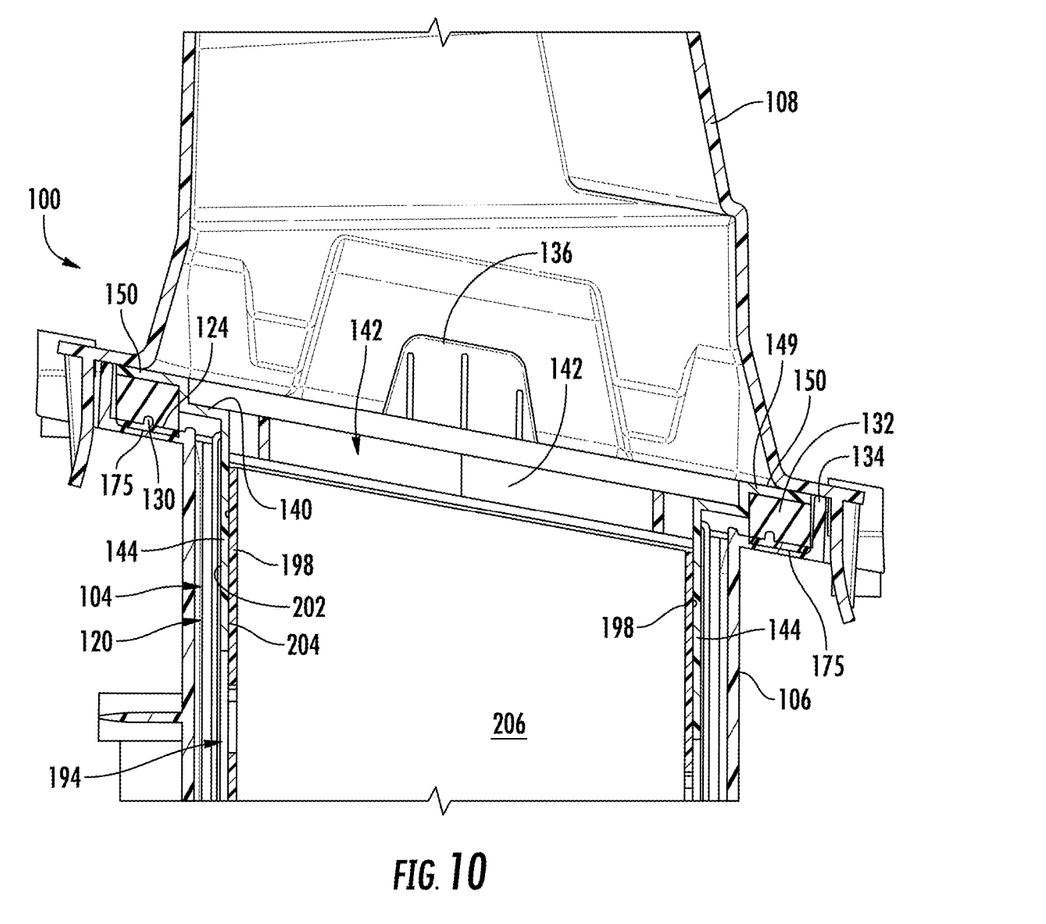
FIG. 10 is a cross-sectional illustration of the filter system of FIG. 1.

With additional reference to FIG. 10, the outlet grate 194 is sealed and attached to the side flaps 144 of the frame 140 of the filter element 104. In particular, the side plates 198 are received between the laterally spaced apart side flaps 144. The outer surfaces 202 of the side plates 198 of the outlet grate are adhesively attached (directly or indirectly) to the inner surfaces 204 of the side flaps 144 of the frame 140 such that the base plate 196 and the frame 140, and particularly the inlet panel 142 thereof, are disposed at opposite ends of the filter element 104. The base plate 196 and side plates 198 of the outlet grate 104 have a perforated structure, such as a honeycomb structure, to allow filtered, outlet air to exit the filter media 206 of the filter element 104.

In some embodiments, when pleated media is used, portions of the media may extend around the side plates 198, between the side plates and side flaps 144 and then around an outer surface of side flaps 144. Adhesive may be used to secure the media in this configuration. The adhesive and filter media will also be used to promote operative sealing between the filter media 206 and the frame 140.

With particular reference to FIG. 5, the filter media 206, which may be pleated filter media, is disposed, at least in part, between the frame 140 and the outlet grate 194. The filter media 206 has opposed flow faces 207, 209. In the present example, folds forming the pleats of the filter media 206 extend in the long direction (e.g. parallel to axis 208 in FIG. 5) and generally form flow faces 207, 209. The filter media 206 includes two end faces 210 that are not covered by the outlet grate 194 or frame 140. In some examples, the outlet grate 194 is taped or otherwise adhesively attached to the filter media 206.

The filter element 104 also has two end caps 212 potted to the frame 140, outlet grate 194 and filter media 206. Each end cap 212 seals against an associated one of the end faces 210 of the filter media 206. The end caps 212 and potting material (if present) seal the pleated ends of the filter media 206. In this example, the end caps 212 are cup shaped. Each end cap 212 receives an end of each side flap 144, an end of the outlet grate 194, and an end of the filter media 206. As illustrated in FIG. 6, one of the end caps is generally located between the filter media 206 and the second portion 176 of the gasket 132.

In some examples, the filter element 104 is generally parallelogram shaped, in which case the gasket plane (e.g. seal surface 175 is parallel to the inlet and outlet flow faces of the filter element 104 and particularly the inlet and outlet flow faces of the filter media 206.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter element for use in a filter housing having a first housing seal interface that surrounds a storage cavity, the filter element comprising:
    filter media;
    a frame attached to the media; and
    a gasket secured to the frame, the frame being more rigid than the gasket, the gasket including a filter element seal interface that surrounds the filter media and is configured to mate with the first housing seal interface, the gasket including a first portion providing an axial seal surface forming part of the filter element seal interface and a second portion providing a radial seal surface forming part of the filter element seal interface.

2. The filter element of claim 1, wherein the gasket is an annular gasket, the first portion of the gasket having a greater radial dimension than the second portion of the gasket.

3. The filter element of claim 1, wherein the gasket has a radially outer periphery formed, at least in part, by the first and second portions, the second portion is stepped radially inward from the first portion forming a radial step in the radially outer periphery of the gasket.

4. The filter element of claim 1, wherein:
    the axial seal surface of the first portion defines a first plane with the first portion being positioned axially on a first side of the first plane; and
    a portion of the radial seal surface of the second portion is axially offset from the first plane and is positioned on a second side of the first plane, opposite the first side.

5. The filter element of claim 3, wherein a first portion of the frame that is adjacent the second portion of the gasket extends radially outward beyond the second portion of the gasket.

6. The filter element of claim 5, wherein the first portion of the frame includes a slot extending axially therethrough.

7. The filter element of claim 6, wherein the slot has a radially inner edge and a radially outer edge, the radial seal surface of the gasket positioned radially at or radially outward of the radially inner edge of the slot.

8. The filter element of claim 1, further comprising at least one end cap; and
    wherein:
        the filter media includes:
            a first face;
            a second face, the filter media extending axially between the first and second faces;
            a first end extending between the first and second faces, the first end cap secured to the first end, the first end cap being positioned radially between the second portion of the gasket and the first end of the filter media.

9. The filter element of claim 1, wherein:
    the gasket includes a third portion between the first portion and the second portion;
    the first portion is angularly offset from the second portion;
    the first portion only provides an axially directed seal and the second portion only provides a radially directed seal, such that at some angular positions only a radially directed seal is provided and at other angular positions only an axially directed seal is provided; and
    the third portion provides both an axially directed seal and a radially directed seal.

10. The filter element of claim 1, wherein the radial seal surface includes at least one groove formed therein, the groove extending longitudinally in an axial direction generally orthogonal to the axial seal surface.

11. An air filter system comprising:
an air filter housing comprising:
a housing body having:
a filter element storage cavity fluidly interposed between an inlet and an outlet;
a seal surface defining a first housing sealing interface surrounding the filter element storage cavity, the first housing sealing interface including:
a first portion including a radially outward extending axial seal surface for providing an axial seal; and
a second portion including an axially extending radial seal surface facing radially into the filter element storage cavity for providing a radial seal; and
a housing tooth adjacent the axially extending radial seal surface, the housing tooth being positioned on a first side of the axial seal surface and the radial seal surface being positioned on a second side of the axial seal surface, opposite the housing tooth;
an air filter element of claim 1, wherein:
the first portion of the gasket axially seals with the first portion of the first housing sealing interface;
the second portion of the gasket radially seals with the second portion of the first housing sealing interface.

12. The filter system of claim 11, wherein:
the frame includes a radially extending flange including a radially directed abutment, the radially directed abutment in radial abutment with the housing tooth radially biasing the frame towards the radial seal surface of the housing body when the filter element is received in the filter element storage cavity; and
the radial biasing of the frame by the housing tooth radially biasing the second portion of the filter element seal interface into the second portion of the housing seal interface.

13. The filter system of claim 12, wherein the frame includes a slot formed in the radially extending flange, the radially directed abutment defining a portion of the slot.

14. The filter system of claim 12, wherein the radially directed abutment radially faces the filter media of the filter element.

15. The filter system of claim 12, wherein the gasket is an annular gasket, the first portion of the gasket having a greater radial dimension than the second portion of the gasket.

16. The filter system of claim 12, wherein the gasket has a radially outer periphery formed, at least in part, by the first and second portions, the second portion is stepped radially inward from the first portion forming a radial step in the radially outer periphery of the gasket, the slot is angularly offset from the first portion of the gasket and is angularly aligned with the second portion of the gasket.

17. The filter system of claim 11, wherein:
the axial seal surface of the first portion of the first housing sealing interface defines a first plane;
when installed, the first portion of the gasket is on a first side of the first plane; and
a portion of the radial seal surface of the second portion is axially offset from the first plane and is positioned on a second side of the first plane, opposite the first side.

18. The filter system of claim 13, wherein the slot has a radially inner edge and a radially outer edge, the radial seal surface of the gasket positioned radially at or radially outward of the radially inner edge of the slot.

19. The filter system of claim 11, wherein the first portion of the gasket is angularly offset from the second portion, wherein the first portion of the gasket only provides an axially directed seal with the first portion of the housing seal interface and the second portion of the gasket only provides a radially directed seal with the second portion of the housing seal interface, such that at some angular positions only a radially directed seal is provided and at other angular positions only an axially directed seal is provided.

20. A filter element, comprising:
a. a frame having an inlet panel, two side flaps, and a slot:
i. The inlet panel having an annular surface surrounding an inlet opening, the annular surface having exterior and interior edges,
ii. the two side flaps being attached along opposite interior edges of the inlet panel, and
iii. the slot located through one side of the annular surface between the interior and exterior edges of the inlet panel;
b. an outlet grate having a base plate and two side plates, the two side plates attached along opposite edges of the base plate, and the exterior surfaces of the two sides plates adhesively attached to the interior surfaces of the side flaps of the frame such that the base plate and the inlet panel are disposed at opposite ends of the filter element;
c. a filter media disposed within the frame and the outlet grate;
d. a gasket attached to the annular surface of the inlet panel, the gasket formed such that the slot in the annular surface is uncovered as well as the portion of the annular surface between the slot and the exterior edge of the annular surface is uncovered, and the gasket having a raised portion between the slot and the interior edge of the annular surface.

21. An air filter system, comprising:
a. a housing body having,
i. an inlet and an outlet in fluid communication;
ii. an annular seal surface extending radially outward from the housing body at the inlet of the housing body, the annular seal surface having an outer lip at an outer edge of the annular seal surface; and
iii. a housing tooth extending from the annular seal surface proximate an inner edge of the annular seal surface upward in a direction substantially perpendicular to the annular seal surface;
b. a filter element having,
i. a frame having an inlet panel and a slot:
1. The inlet panel having an annular surface surrounding an inlet opening, the annular surface having exterior and interior edges, and
2. The slot located through one side of the annular surface between the interior and exterior edges of the inlet panel; and,
ii. a gasket attached to the annular surface of the inlet panel, the gasket formed such that the housing tooth extends through the slot in the annular surface, and the gasket having a raised portion between the slot and the interior edge of the annular surface; and,
c. the filter element is situated within the housing body such that the gasket seals against the annular seal surface of the housing body, and such that the housing tooth is disposed through the slot in the annular surface, wherein the interaction between the frame and the housing tooth provides a lateral bias of the raised portion of the gasket radially into the housing body proximate the housing tooth.

* * * * *